(12) United States Patent
Poulin et al.

(10) Patent No.: US 12,165,496 B2
(45) Date of Patent: Dec. 10, 2024

(54) SYSTEM AND DEVICE FOR RAPID COMMUNICATION WITH EMERGENCY RESPONDERS DURING A CRISIS

(71) Applicant: Guardian Call Solutions, Inc., Clearwater, FL (US)

(72) Inventors: Karl Poulin, Clearwater, FL (US); Craig Gundry, Clearwater, FL (US)

(*) Notice: Subject to any disclaimer, the term of this patent is extended or adjusted under 35 U.S.C. 154(b) by 345 days.

(21) Appl. No.: 17/805,483

(22) Filed: Jun. 6, 2022

(65) Prior Publication Data
US 2023/0394954 A1   Dec. 7, 2023

(51) Int. Cl.
| | |
|---|---|
| G08B 25/01 | (2006.01) |
| G08B 25/10 | (2006.01) |
| G08B 25/14 | (2006.01) |
| H04W 4/14 | (2009.01) |
| H04W 4/90 | (2018.01) |

(52) U.S. Cl.
CPC .......... *G08B 25/016* (2013.01); *G08B 25/10* (2013.01); *G08B 25/14* (2013.01); *H04W 4/14* (2013.01); *H04W 4/90* (2018.02)

(58) Field of Classification Search
CPC ...... G08B 25/016; G08B 25/10; G08B 25/14; G08B 25/009; G08B 25/006; H04W 4/14; H04W 4/90
USPC ...................................... 455/404.2
See application file for complete search history.

(56) References Cited

U.S. PATENT DOCUMENTS

| | | | | |
|---|---|---|---|---|
| 9,767,677 | B1* | 9/2017 | Paulin .................. | G08B 25/005 |
| 10,319,214 | B1* | 6/2019 | Hannigan ............ | G08B 25/005 |
| 11,504,074 | B1* | 11/2022 | Meyer .................. | G08B 25/016 |
| 2020/0020221 | A1* | 1/2020 | Cutler .................. | G08B 21/088 |

(Continued)

FOREIGN PATENT DOCUMENTS

| | | |
|---|---|---|
| CN | 206584499 | 10/2017 |
| CN | 107590953 A | 1/2018 |
| CN | 109697827 | 4/2019 |

(Continued)

OTHER PUBLICATIONS

Gannapathy, Vigneswara Rao et al., Zigbee-based Smart Fall Detection and Notification System with Wearable Sensor (e-safe), IJRET: International Journal of Research in Engineering and Technology, vol. 02 Issue: 08 | Aug. 2013, Available @ http://www.ijret.org, pp. 337-344.

*Primary Examiner* — Tanmay K Shah
(74) *Attorney, Agent, or Firm* — Larson & Larson; Justin P. Miller; Frank Liebenow

(57) ABSTRACT

The system and device for rapid communication with emergency responders during a crisis includes a wearable alarm and notification device. The wearable device is worn by, for example, the staff and faculty members of a school. When activated, the wearable device sends a signal to a central system or server, the central system simultaneously triggering numerous actions. For example, the server simultaneously performs the following actions: sending alerts to parties based on predefined groups; causing the public address system to play an alarm or a prerecorded message; sending messages by additional other means, for example SMS, email, phone calls, push notifications, and so forth; and triggering a lockdown, the lockdown either of the area around the activated mobile device, the entire campus, or a subset of the entire campus.

20 Claims, 18 Drawing Sheets

(56) References Cited

U.S. PATENT DOCUMENTS

2020/0275249 A1* 8/2020 Kim .................. H04W 12/0431

FOREIGN PATENT DOCUMENTS

| CN | 107067676 | 4/2020 |
| CN | 107590953 B | 5/2021 |

* cited by examiner

| Task/Activities | Marjory Stoneman Douglas H.S. (2018) | Sandy Hook Elementary School (2012) | Virginia Tech (2007) |
|---|---|---|---|
| Casualties | K-17/W-15 | K-26 | K-32/W-17 |
| Attack initiated / Killer(s) enter and or commence killing | T 14:21 | T 09:34 | T 09:40 |
| Mass killing in full progress | T 14:22 | T 09:35 | T 09:42 |
| Shooting stopped (Killer escaped, shot by police, or committed suicide) | T 14:27 | T 09:40 | T 09:51 |
| Adversary Task Time (Mass Killing) | ~ 1 min | ~ 1 min | ~ 2 min |
| Type of Police/Security Response | SRO/Local PD | Local PD | Campus PD |
| First Call to 911/999 | T 14:23 | T 09:35 | T 09:42 |
| Police Dispatched | T 14:23 | T 09:36 | T 09:42 |
| First responding police arrive | T ??:?? | T 09:37 | T 09:45 |
| Police enter to tactically clear | T 14:32 | T 09:44 | T 09:52 |
| On-Scene Response Time | ???? | ~ 25 min | ~ 3 min |
| Effective Response Time | ~ 9 min | ~ 9 min | ~ 12 min |

FIG. 12

SYSTEM AND DEVICE FOR RAPID COMMUNICATION WITH EMERGENCY RESPONDERS DURING A CRISIS

FIELD

This invention relates to the field of emergency notification systems and more particularly to a system and method to quickly communicate with authorities regarding an on-site threat while simultaneously alerting others in the area of potential danger.

BACKGROUND

When there is a threat in a public space, quick communication with authorities is critical because timing is everything.

Considering the debilitating physiological and mental effects which occur under life-threatening high stress conditions, it is unreasonable to rely on an on-site individual to use a personal cell phone to dial emergency responders and clearly report the location and type of threat.

What is needed is a system that allows an individual, such as a teacher or faculty member, to directly notify emergency services without requiring the use of a traditional cell phone, the system simultaneously activating other emergency notification systems, while allowing emergency services to identify the location of the caller.

SUMMARY

The system and method for rapid communication with emergency responders during a crisis includes a wearable alarm and notification device. The wearable device is worn by, for example, the staff and faculty members of a school.

When activated, the wearable device sends a signal to a central system or server, the central system simultaneously triggering numerous actions. For example, the server simultaneously performs the following actions:

Sending alerts to parties based on predefined groups, for example faculty, 911 emergency responders, or a dedicated emergency team;
Causing other wearable devices to amend an audible alarm and/or a prerecorded message;
Causing the public address system to play an alarm or a prerecorded message;
Sending messages by additional other means, for example SMS (Short Message Service), email, phone calls, and push notifications; and
Triggering a lockdown, the lockdown either of the area around the activated mobile device, the entire campus, or a subset of the entire campus.

Whenever the wearable device is activated, the shared data includes the physical location of the activating faculty member. This allows the system to make decisions based on the faculty members location, such as whether on or off campus, as well as in which section or building of the campus the wearable device was activated.

Additionally, the means of activation of the wearable device is variable. While activation by the user depressing a button is the preferred embodiment, in alternative embodiments other methodologies of activation include detection of a fall, or detection of an anomalous heartbeat that could indicate danger, injury, or death.

By efficiently communicating with emergency personnel, in conjunction with the schoolwide notification, the wearable device and associated system combine what the prior art can only accomplish as multiple steps. The result of requiring multiple steps set the prior art creates unnecessary delays, correspondingly increasing the number of victims associated with a violent event.

Historically, when there is an emergency on a school campus, faculty and staff must separately activate multiple independent systems. For example, a first teacher dials an emergency number, such as 911 in North America, and communicates with emergency personnel. During this call, the caller must verbally share their physical location because emergency personnel will not automatically be notified of the caller's location. For example, emergency personnel may know the school from which the caller is dialing, but that is insufficient information for locating the threat.

A public address announcement must also be issued, notifying everyone else on campus of the situation. This is often a separate system and may not be accessible by teachers. Thus, given that the first teacher is likely calling 911, a second teacher must notify staff in the front office of the threat, who then can make a public announcement. Each of these steps takes time and presents additional potential points of failure.

The time between detection of an attack, and a school-wide lockdown in combination with notification of emergency authorities, is the critical measurement that determines the number of casualties.

Sequential and complex notification procedures require two to three minutes before notification is complete, and even more time when the faculty cannot directly access the public address system. The effect of the delay is increased casualties.

The use of a wearable device is critical for both the faculty person triggering the alarm, as well as other faculty members being notified of the alarm. It is inefficient to rely on a faculty member's use of their personal cell phone to call emergency services, and also inappropriate to rely on other faculty members monitoring their cell phones for alerts generated through phone-based notifications, or SMS.

By having a dedicated, wearable device, a faculty member can always readily and rapidly trigger an alarm, as well as receive alarms generated by the system.

Perhaps the most important benefit of using a purpose-built body worn device is that the device can be designed for use in high-stress situations.

During high-stress events, the sympathetic nervous system (SNS) activates, enabling the fight or flight response. The result is a heart rate that increases up to 200 beats per minute, impairment of cognitive processing, and the loss of fine motor skills. This often manifests as hand tremors and fumbling.

Requiring fine motor skills, such as typing in the code to unlock a cell phone, or to swipe a virtual slider, creates delays and therefore increases the time to notification.

A hardware device that is activated by physical buttons overcomes the shortcomings of using a cell phone for notification.

Having the device as an independent, body-worn device allows it to be centrally controlled to, for example, issue audible announcements. This may not be possible using a cell phone because the user can silence, power off the cell phone, or otherwise suppress notifications.

The device is body worn, such as a watch or a pendant, making the device readily accessible no matter where on campus the faculty member is located.

The device includes both a microphone and speaker, allowing it to both generate and receive audio.

In addition to its multitude of features, the device needs to be affordable.

Turning to the operation of the device in detail, the device is preferably activated by the user holding a hardware button. Including the step of holding the button helps to avoid accidental activations.

The device then vibrates and starts an onscreen countdown. After a predefined period of time, for example three seconds, the device directly dials 911. Using the microphone and speaker on the device, and communicating through a cell phone network, the device directly connects the user to the 911 operator. The user can then explain the situation to the operator, providing critical real time on-site information.

Simultaneously, the device initiates a series of alerts. For example, causing all devices inside the building, or on campus, to broadcast an audible alert message. Other devices also display information on their respective screens, summarizing the situation for staff members.

A separate message is sent directly to the school resource officer and to emergency personnel. These messages include the physical location of the device being activated.

Text messages are sent to all faculty and staff cell phones, helping to alert any off-site personnel.

Optionally, the system dials all faculty and staff cell phones, playing a prerecorded message. This is helpful to notify off-site staff.

If the public address system is a modern, Internet-based system, a call can be placed into the public address system, the public address system then playing a prerecorded message.

Returning to the user who activated the wearable device, in the preferred embodiment the wearable device waits until after activation to monitor the user's vital signs. In an alternative embodiment, the wearable device constantly monitors the user's vital signs. The drawback of the alternative embodiment is increased battery use, and thus a need for more frequent charging.

If the user's heartbeat stops during monitoring the system immediately sends a message to emergency personnel indicating the location of the alerting wearable device.

In non-emergency situations the wearable device can distribute notifications that do not involve on-site threats. For example, missing students, classroom disturbances, and medical emergencies.

Administrators may also use the system to distribute notifications to all users of the wearable device. For example, weather alerts and school closures.

The system can be preloaded with messages, either template messages with fields to be filled in, or fully-drafted messages, that may then be quickly distributed in the future by selecting appropriate options from a menu.

The messages can also be reconfigured for differing distribution depending on the party. For example, faculty members can receive messages sent to the wearable device, where parents will need messages sent by text or email. The system can determine how to send each message by having contact information associated within a database with different groups of users. For example, a contact group of faculty members with contact data and communication type, and a contact group of parents with contact data and communication type.

An example of a preconfigured message that requires differing distribution rules depending on the party receiving includes a school reunification order.

Teachers and faculty that use the wearable device can accept the message through the device, but parents will require notification by SMS or email.

Turning to the hardware inside the wearable device, generally included is a base unit or module with a wrist strap, or a means to attach to a neck strap if unit is worn as pendant. Within the base unit is it power source or battery, screen, source of vibration for haptic feedback, and a collection of electronics and sensors to measure the environment and control the outputs.

The sensors are preferably located under the base unit, where they face, and ideally have contact with, the skin of the user.

Sensor units optionally include an optical sensor array, a thermometer, a galvanic skin response (GSR) sensor array, a bioimpedance (BioZ) sensor array, an electrocardiogram or electrocardiography (ECG) sensor, and/or a heartbeat sensor.

Internal sensors optionally include an accelerometer, GPS unit, ambient light, air pressure, humidity, microphone, speaker, and a thermometer to measure ambient temperature.

Communication is enabled using one or more connectivity options. The preferred method of communication is by cell network because it does not rely on infrastructure associated with the school or campus. Optionally, backup communication systems are included such as Wi-Fi or other wireless communication protocols.

In an alternative embodiment, the wearable device is used by individuals meeting third parties in private circumstances. For example, a real estate agent meeting a prospective buyer in a home. In such circumstances, the individual is meeting someone with whom they are unfamiliar, in a private place, and thus may be concerned for their safety.

The wearable device can be used in such circumstances as a private alarm system. In such circumstances, the wearable device is configured for silent activation to allow the user to notify emergency personnel without warning the third party that a call has been made.

This can be accomplished by, for example, dialing emergency personnel and then playing a prerecorded message. The message notifies emergency personnel that the user is in a compromised situation and unable to speak.

The system can also convert information gathered from the wearable device into audio information for the emergency personnel. For example, GPS coordinates of the wearable device, and user status information, for example whether or not they are moving, heartbeat, and stress response.

Emergency personnel can also listen to the audio generated by the wearable device they make determinations of the nature of the emergency based on what is being said by the user and the one or more third parties.

BRIEF DESCRIPTION OF THE DRAWINGS

The invention can be best understood by those having ordinary skill in the art by reference to the following detailed description when considered in conjunction with the accompanying drawings in which:

FIG. 12 illustrates a chart showing response times in various school shooting scenarios.

DETAILED DESCRIPTION

Figure 1:
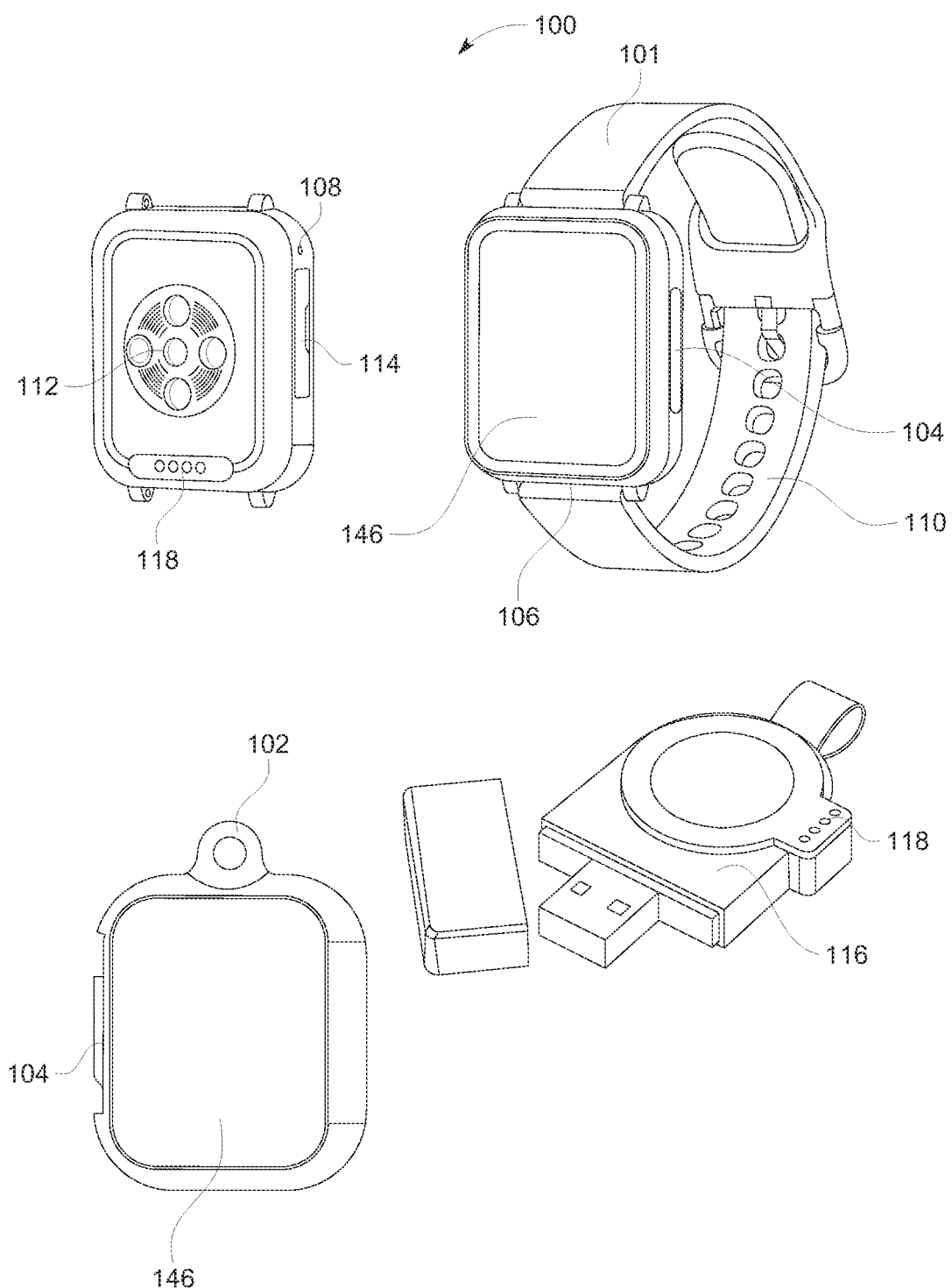
FIG. 1 illustrates a collection of views of the first embodiment of the wearable device.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a collection of views of the first embodiment of the wearable device is shown.

The wearable device 100 is shown in multiple forms, including a wrist-worn embodiment 101 and a pendant embodiment 102.

Each embodiment includes an activation button 104, speaker 106, microphone 108, sensor array 112, display 146, optional sim card slot 114, and optional charging pins 118.

The wrist-worn embodiment 101 includes a band 110, the pendant embodiment 102 includes lanyard connection 103.

Also shown is charger 116, which can charge the wearable device 100 using either optional charging pins 118 or inductive charging.

Figure 2:
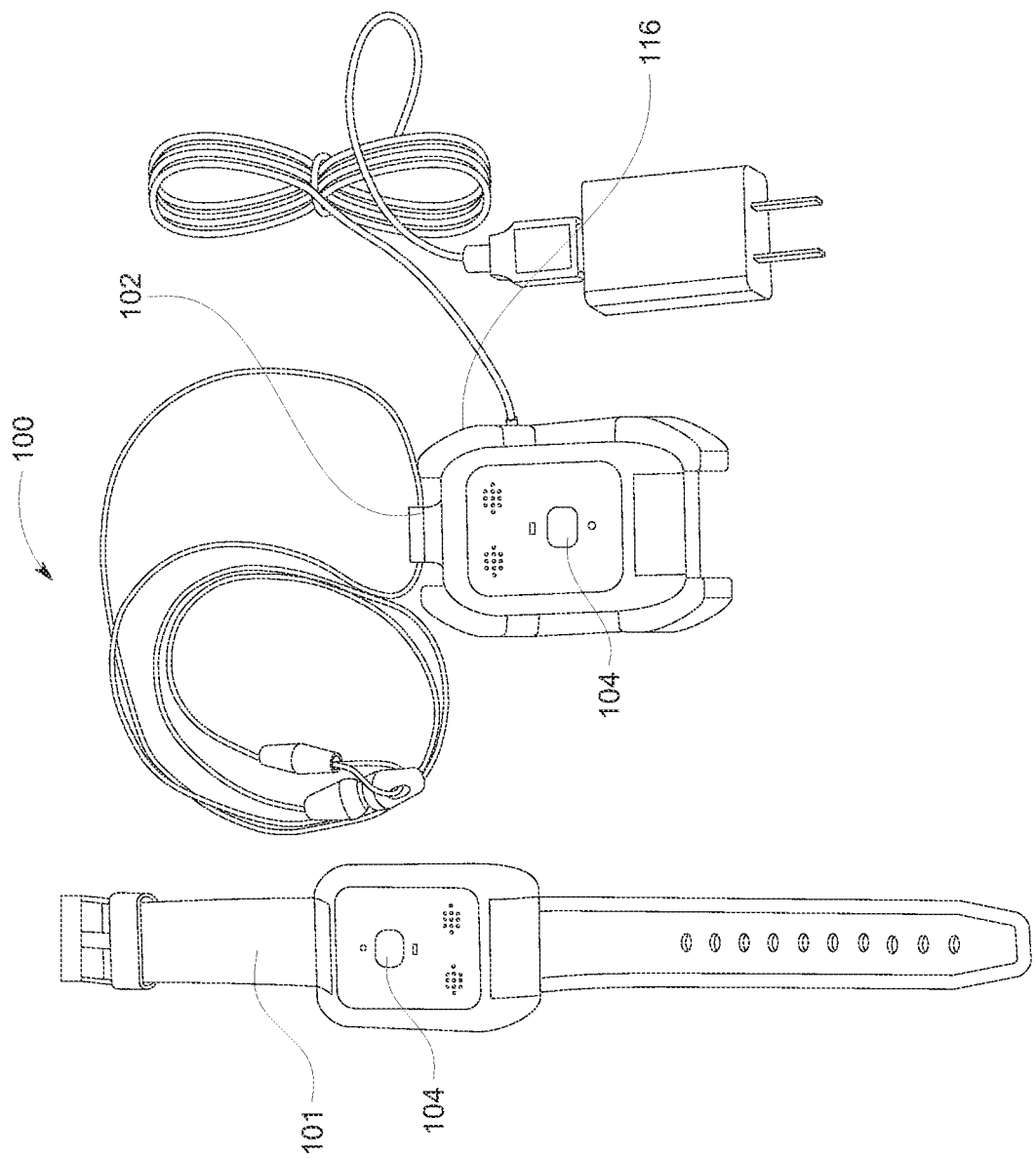
FIG. 2 illustrates a collection of views of the second embodiment of the wearable device.

Referring to FIG. 2, a collection of views of the second embodiment of the wearable device is shown.

The second embodiment of the wearable device 100 does not include a display 146 (see FIG. 1). The second embodiment can take the form of a wrist-worn embodiment 100, or a pendant embodiment 102. Each includes include an activation button 104 and is recharged using charger 116.

Figure 3:
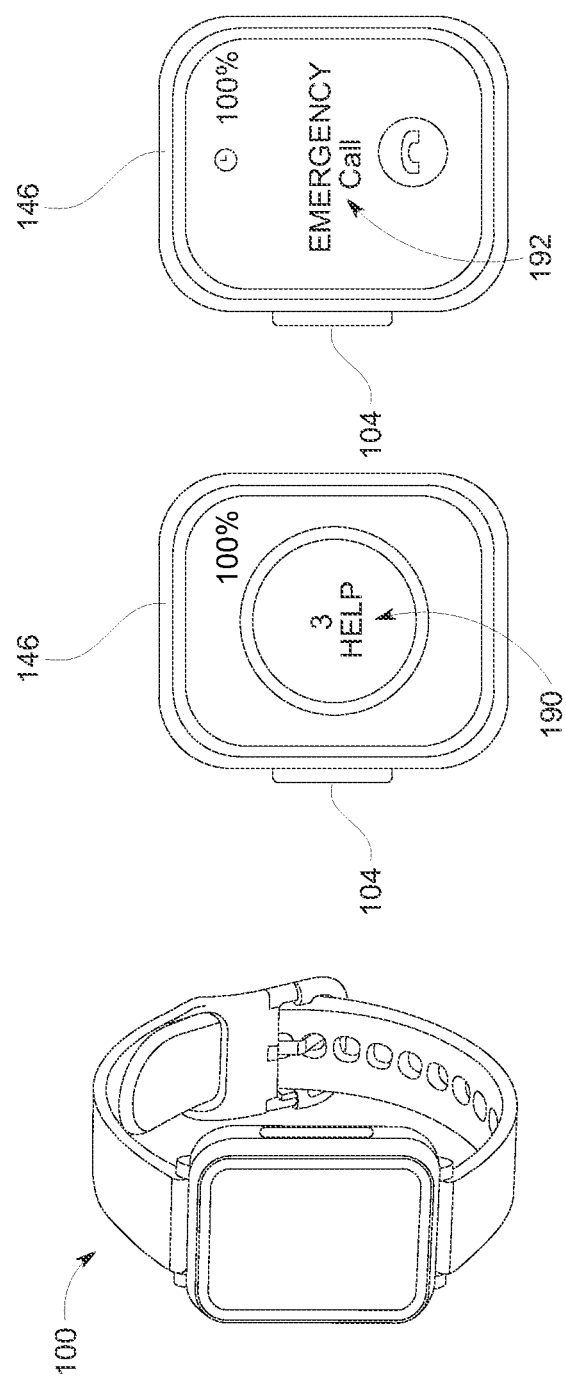
FIG. 3 illustrates an example of graphics displayed on the screen of the wearable device.

Referring to FIG. 3, an example of graphics displayed on the screen of the wearable device is shown.

The wearable device 100 includes a display 146 on which graphics and messages can be displayed.

For example, when the activation button 104 is held down by the user, the system begins a countdown 190. After the system completes the countdown a call is placed to emergency responders 192. During this call the user is directly connected to emergency personnel. This allows for immediate communication between the caller and emergency services providers.

Figure 4:
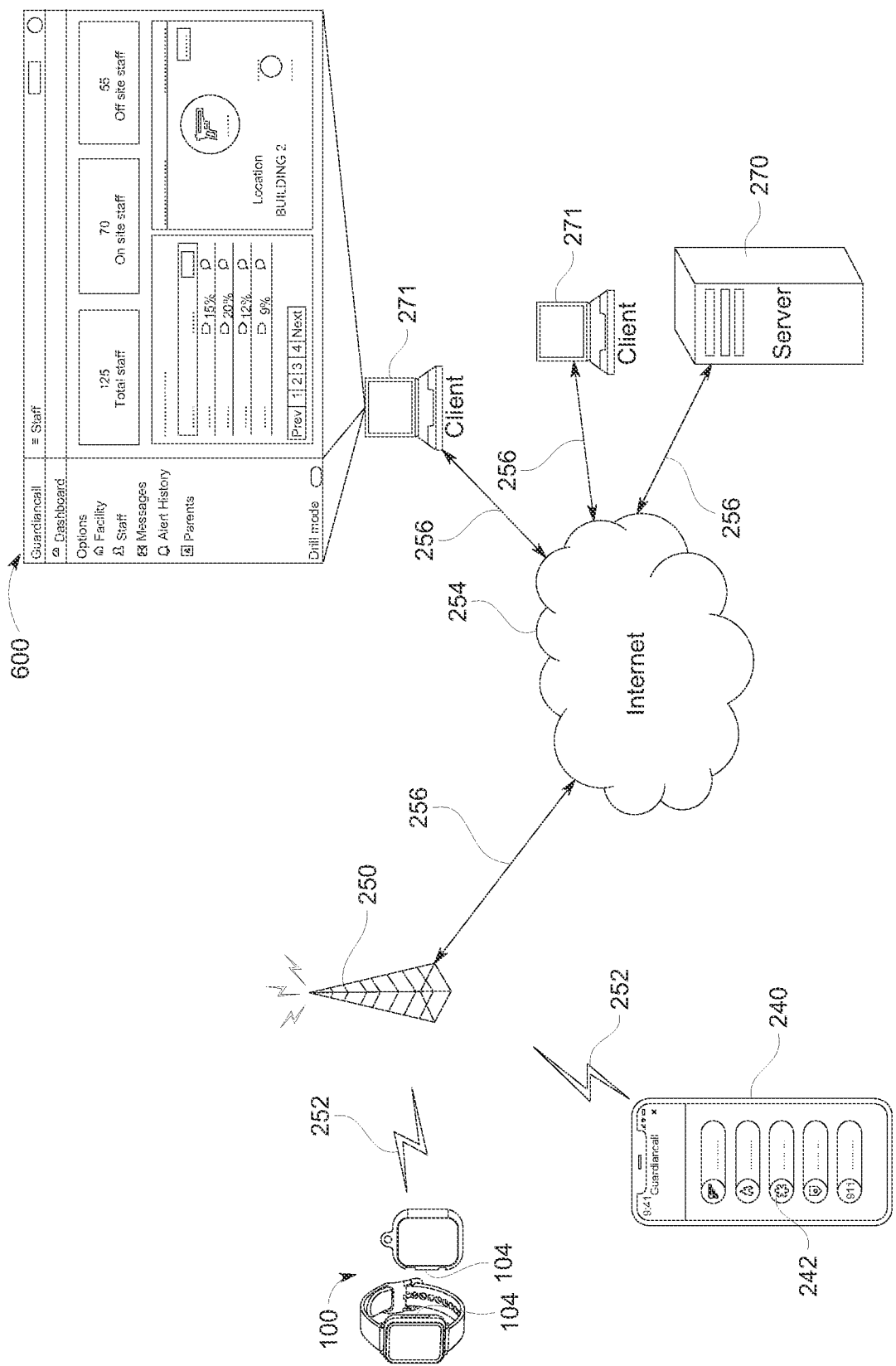
FIG. 4 illustrates an overview of the connectivity of the system.

Referring to FIG. 4, an overview of the connectivity of the system is shown.

After activation is triggered by the user holding the activation button 104 the wearable device 100 communicates via wireless signal 252 to the cell tower 250. A cell tower 250 supports one or more data transceivers for sending and receiving information with respect to the wearable device 100. Data passes over the data connection 256 to the Internet 254 and to the server 270.

One or more clients 271 communicate with the server 270 via data connections 256 and through the Internet 254. Any user of a client 271 can view the system web interface 600, to monitor any alerts. Please see FIG. 12 for additional discussion of the system web interface 600.

Alternatively or additionally, a mobile phone 240, via the mobile phone interface 242, can communicate with the cell tower 250 via wireless signal 252.

In this manner data can be passed between the wearable device 100, cell phone 240, server 270, and clients 271.

Figure 5:
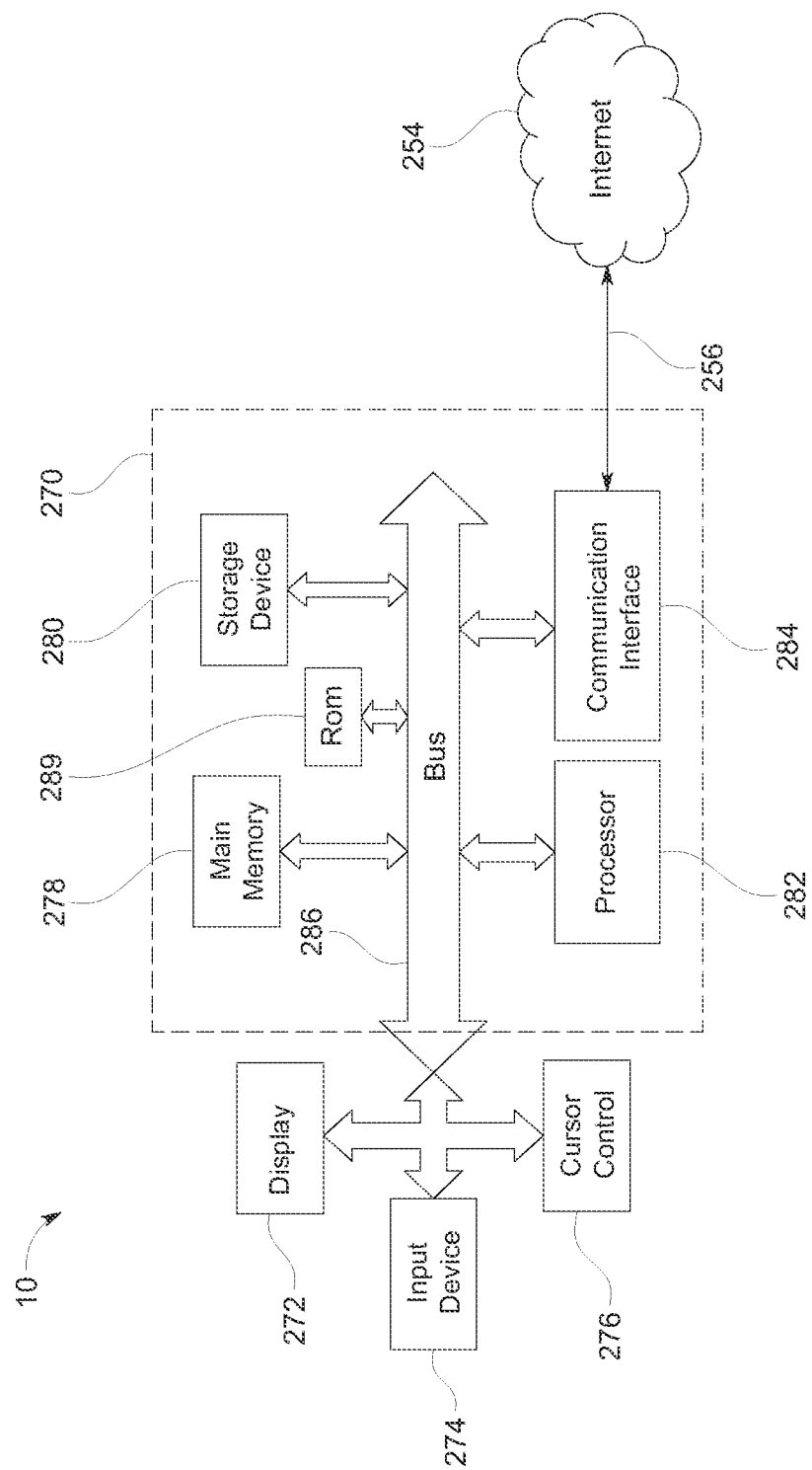
FIG. 5 illustrates an example of the server of the system.

Referring to FIG. 5, an example of the server of the system is shown.

The server 270 includes numerous components, for example main memory 278, storage device 280, processor 282, ROM 289, and communication interface 284, all communicating with each other via bus 286.

Optionally included is display 272, keyboard 274, and mouse 276.

The server 270 communicates with the Internet 254 via the communication device 284.

It is noted that the server components as described can be physical components, or a virtual server operating as a partitioned space inside a physical server.

Figure 6:
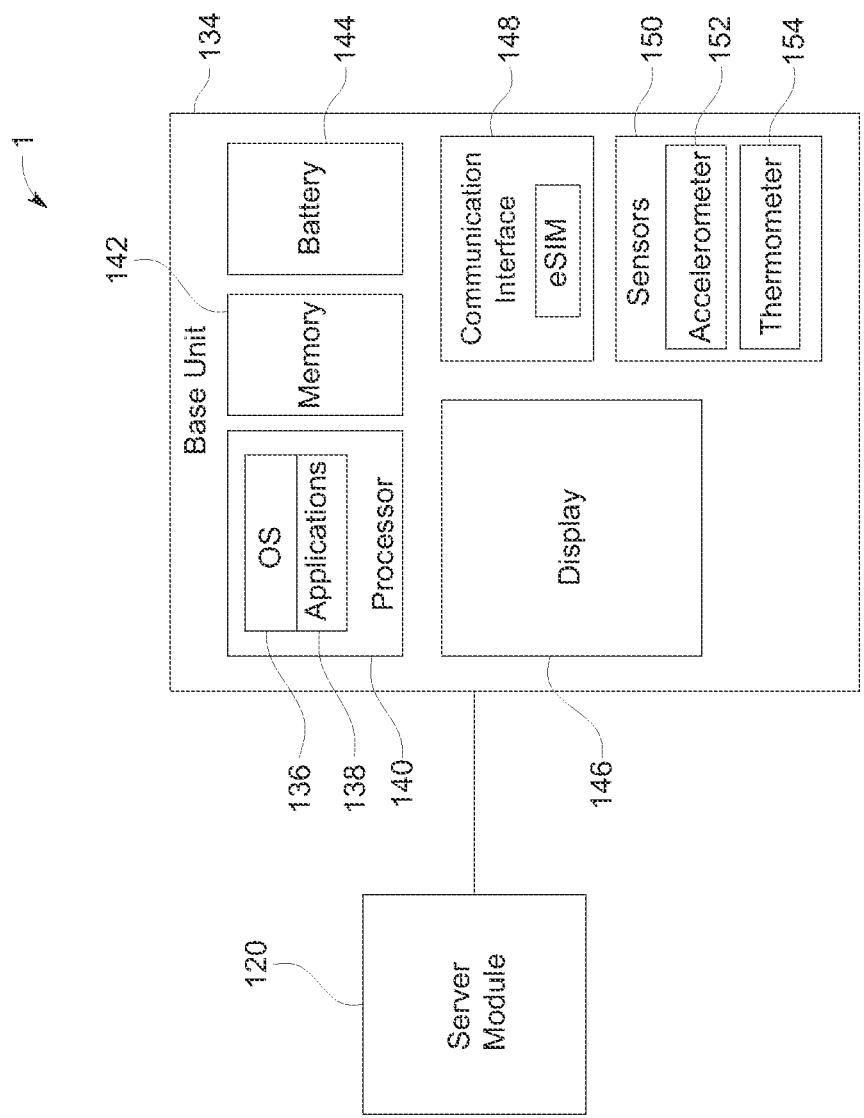
FIG. 6 illustrates a schematic of the base unit of the wearable device.

Referring to FIG. 6, a diagram of the base unit of the wearable device is shown.

The wearable device 100 includes base unit 134. Within base unit 134 is processor 140 which executes instructions associated with operating system 136 and applications 138. Also included is memory 142, battery 144, display 146, communication interface 148, and internal sensors 150, including accelerometer 152 and thermometer for ambient temperature 154.

Figure 7:
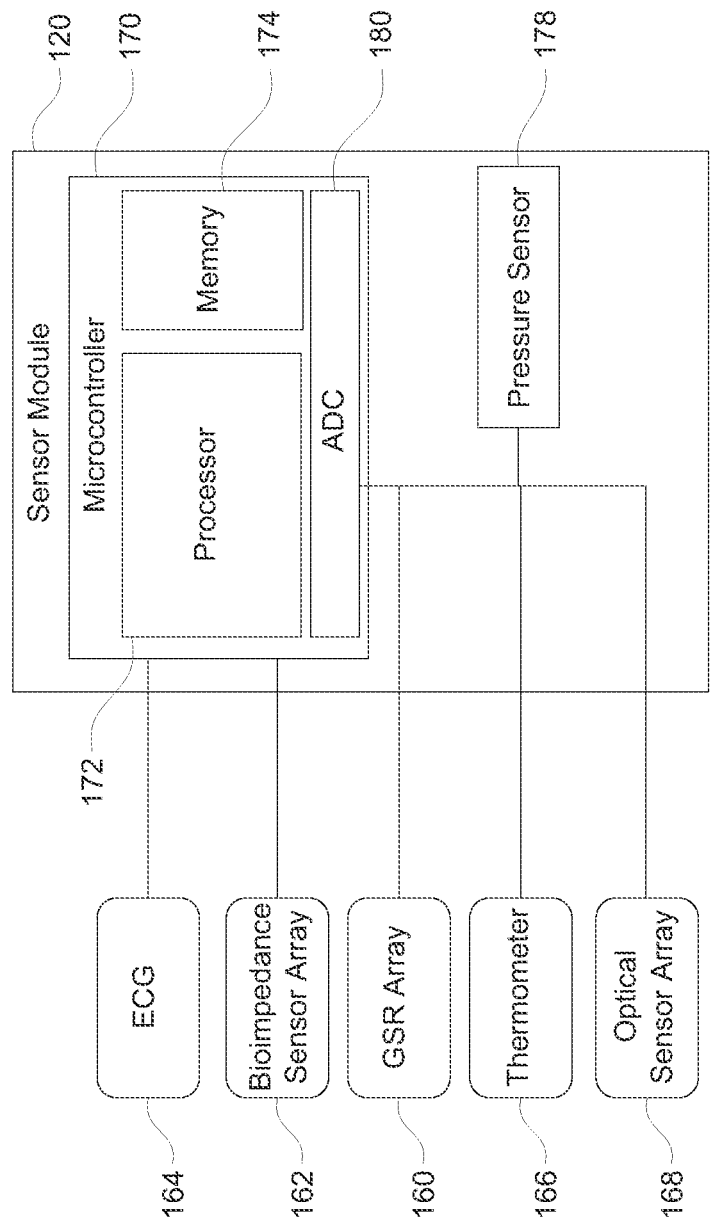
FIG. 7 illustrates a schematic of the sensors of the wearable device.

Sensor module 120 is further described in FIG. 7.

Referring to FIG. 7, a schematic of the sensors of the wearable device is shown.

Sensor module 120 optionally includes numerous sensors, including: a galvanic skin response sensor 160 to measure electrical conductance of the skin that varies depending on sweat level; a bioimpedance sensor 162 that measures the resistance of the skin to the flow of electrical current; an electrocardiogram sensor 164 that measures activity of the user's heart; a thermometer for skin temperature 166; optical sensor array 168 to measure blood flow, blood oxygen level, and pulse; and pressure sensor 178 to measure the force between the sensor module 120 and the user's skin.

The data collected by the sensor module 120 allows the system to monitor the condition of the user. If needed the server 270 can call for data associated with certain events. For example, heartbeat information may always be provided to the server, but bioimpedance may be provided only after activation of the device.

Optionally included is a microcontroller 170 that preprocesses sensor information, the microcontroller 170 including a processor 172, memory 174, and analog to digital converter 180.

Figure 8:
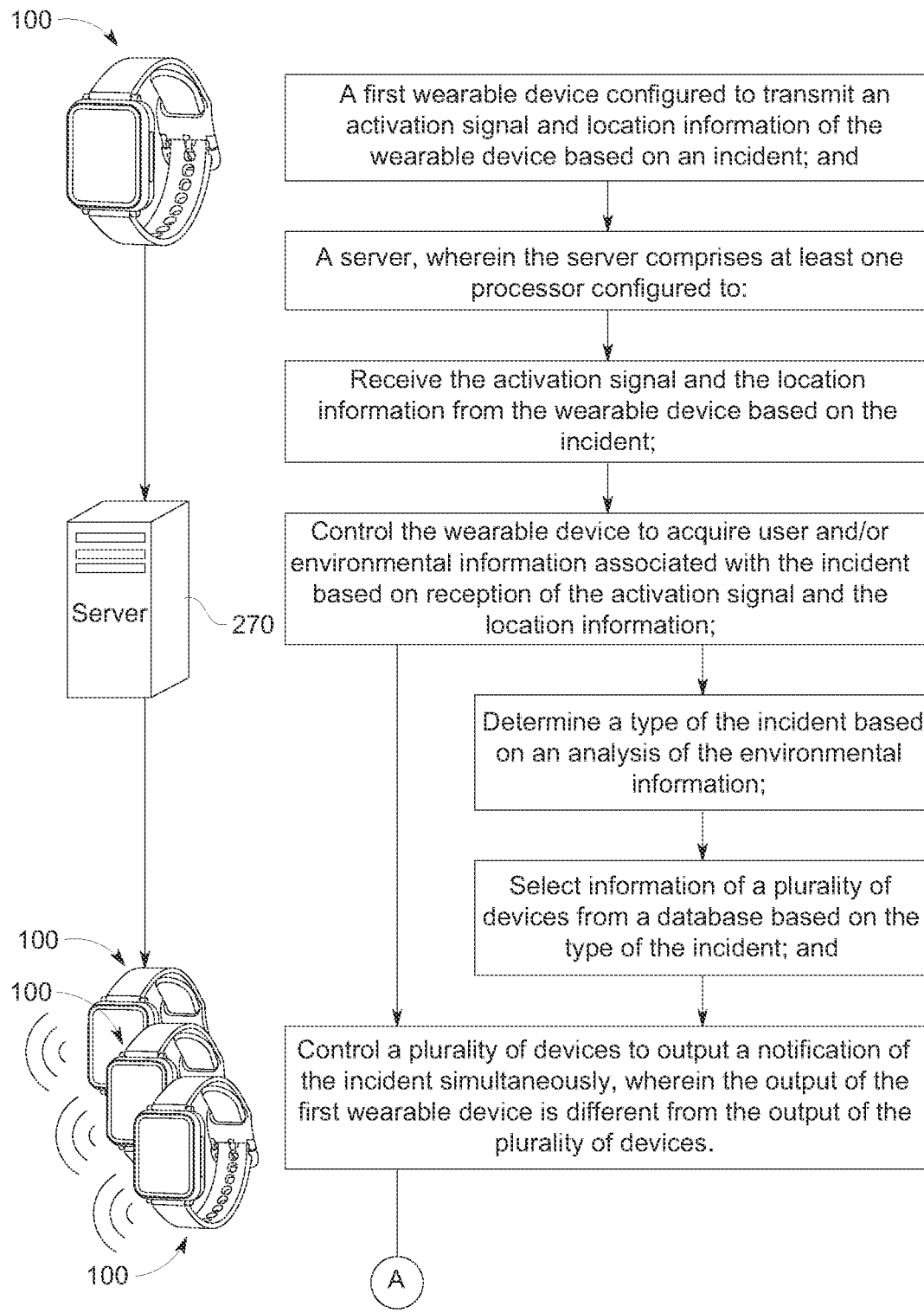
FIG. 8 illustrates a flow chart of the steps performed by the system following activation.
Figure 8:
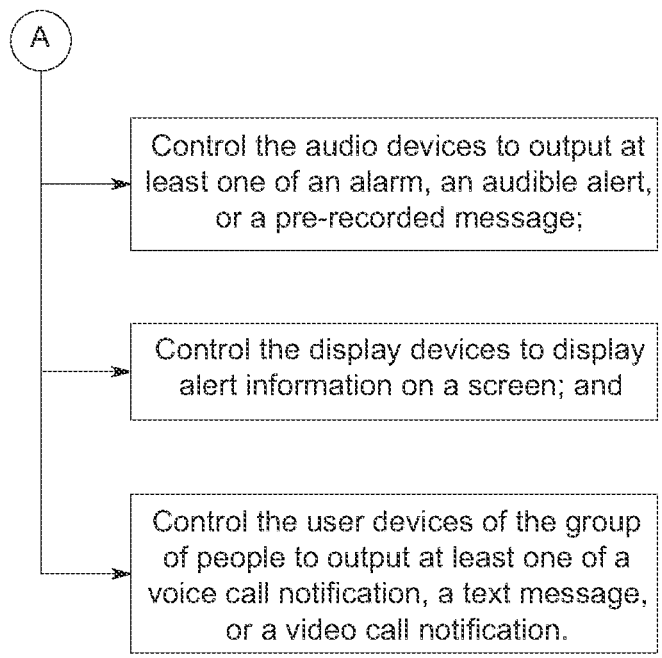

FIG. 8 illustrates a flow chart of the steps performed by the system following activation.

The hardware includes a first wearable device 100, server 270, and plurality of secondary wearable devices 100.

The first wearable device 100 is activated, transmitting an activation signal and location information to the server 270. The server receives the activation signal and location information from the first wearable device, and then requests environmental information from the first wearable device, for example, user heartbeat information, additional location information, or audio.

The system then optionally determines the type of incident based on the analysis of the environmental information. For example, if gunshots are heard the system may determine that there is an active shooter.

Based on the type of incident, the server then controls a plurality of secondary wearable devices to output a notification of the incident. This notification is different for the second plurality of devices than for the first device, the device that was activated. For example, the first device is likely connected to emergency responders, and the secondary set of devices is likely emitting an audible alarm.

The server then optionally controls the audio devices of the secondary wearable devices to output an alarm, and audible alert, or a pre-recorded message.

The server may also cause the secondary wearable devices to display alert information on their screens and to alert third parties who do not have wearable devices but have alternative devices, for example cell phones. The server initiates contact with the third-party devices via voice call, text message or video call.

Figure 9:
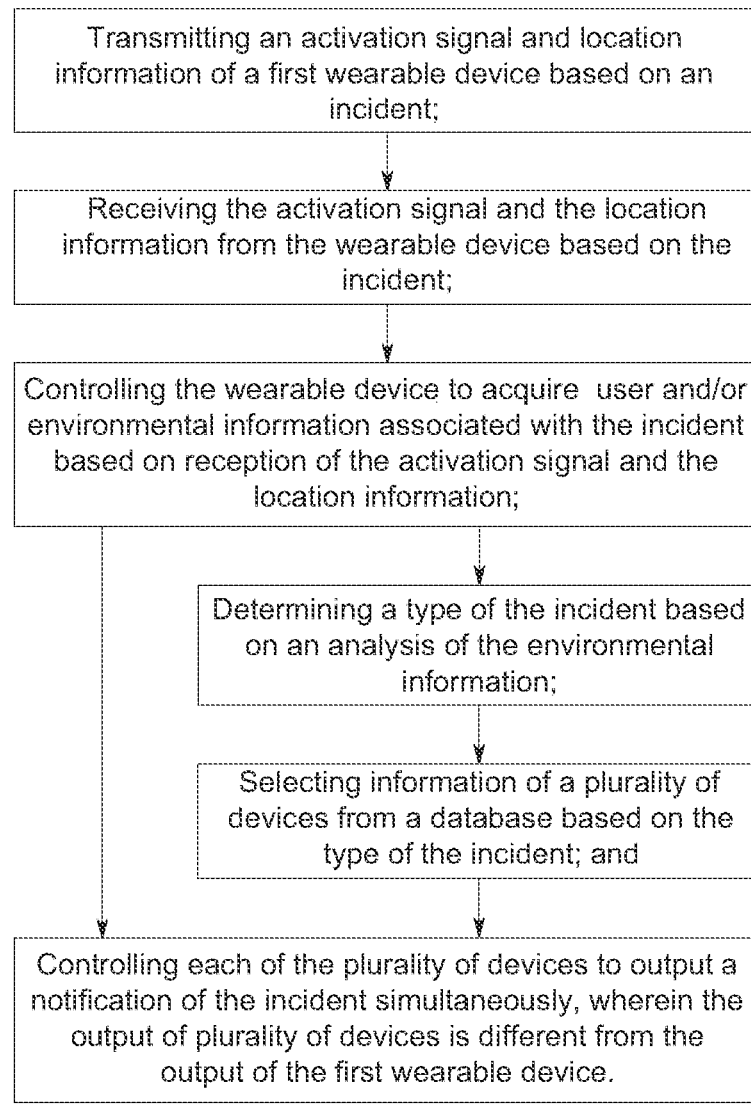
FIG. 9 illustrates a flow chart of the method of reporting an incident and controlling the plurality of devices.

FIG. 9 illustrates a flow chart of the method of reporting an incident and controlling the plurality of devices.

The method includes the following steps:

The first step is transmission of an activation signal in combination with location information of the wearable device that was activated.

The second step is receipt of the activation signal and location information from the wearable device.

The third step is control of the wearable device to acquire user or environmental information, such as the user's heartbeat, measured stress response, or sounds and/or video from the location of activation.

The fourth step is the optional step of determining the type of incident based on evaluation of the environmental information.

The fifth step is controlling multiple wearable devices to cause an output, for example, an alarm or audible announcement. The wearable device that was activated has a different output than the non-activated wearable devices. The activated wearable device is likely connected to emergency responders, or the other wearable devices are emitting an alarm or other type of notification.

Figure 10:
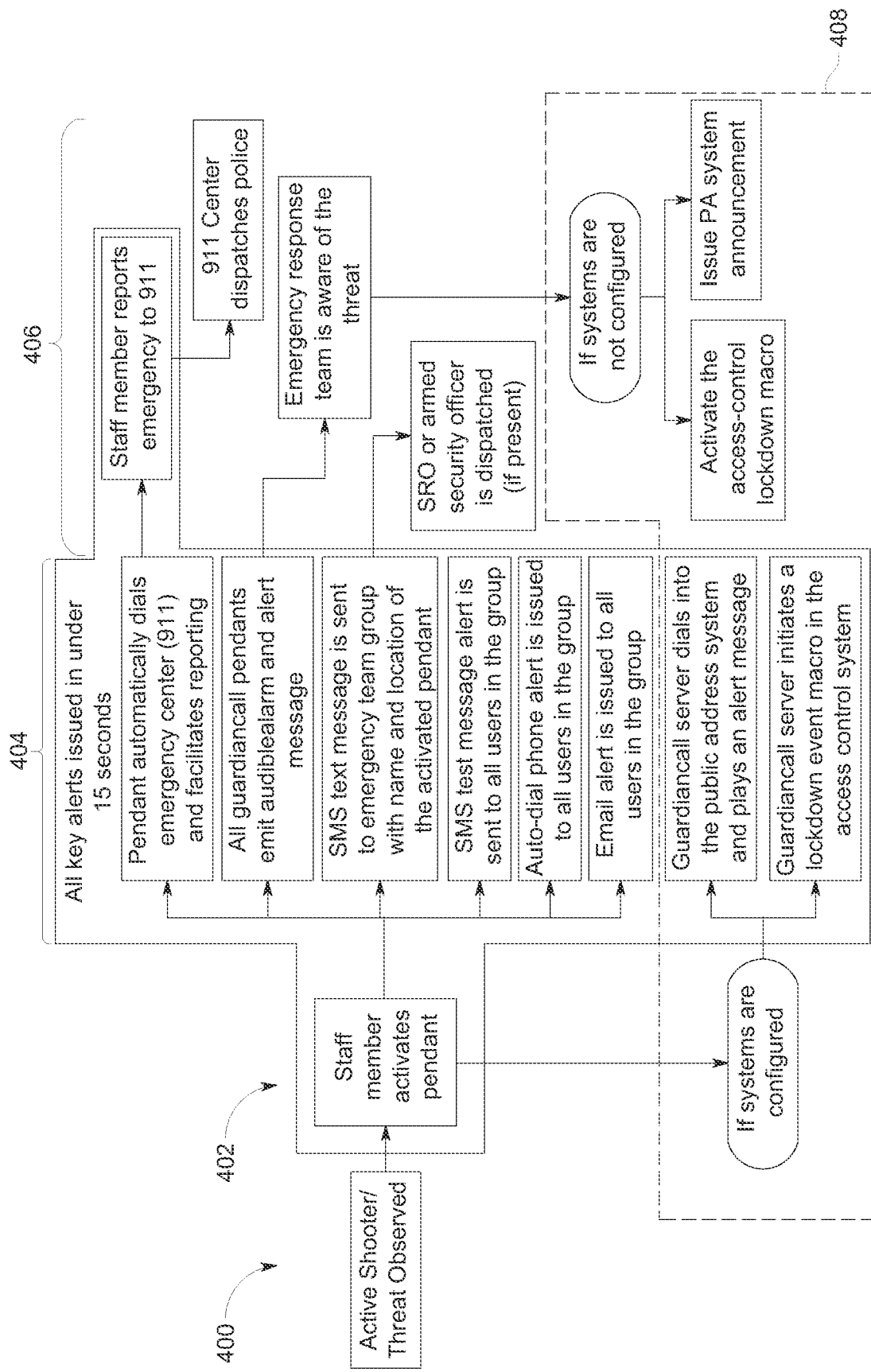
FIG. 10 illustrates a flow chart showing the steps performed after activation of the system.

Referring to FIG. 10, a flow chart showing the steps performed after activation of the system is shown.

After observation of threat 400, the user performs the step of activation of device 402. The result is numerous simultaneous actions triggered by activation 404, all the simultaneous actions occurring within 15 seconds of pendant activation.

These actions include: the wearable device directly dialing 911; all other wearable devices on campus emitting an audible alarm and alert message; SMS text messages sent to an emergency team group with the name and location of the activated wearable device; SMS text messages sent to all users in specified groups; phone alert issued by auto-dialer to all users in a group; and email alerts issued to all users in a group.

Optionally included in the simultaneous actions 404 are the public address interface steps 408.

If public address systems can be configured for remote activation, the server dials into the public address system on campus and plays an alert message. Also, if systems can be configured as such the server initiates a lockdown event, initiating campus access control.

If the public address system cannot be configured for automatic activation, the emergency response team is responsible for issuing a public address announcement and initiating campus access control.

By virtue of multiple actions being triggered simultaneously, the actions by third parties 406 are also simultaneous. For example, following activation, the staff member speaks with emergency personnel via the wearable device as other devices on campus simultaneously issue audible alarms and alert messages.

The SMS to the emergency team includes a message to the school resource officer or armed security officer, triggering the officer to respond and to be aware of an armed threat.

Figure 11:
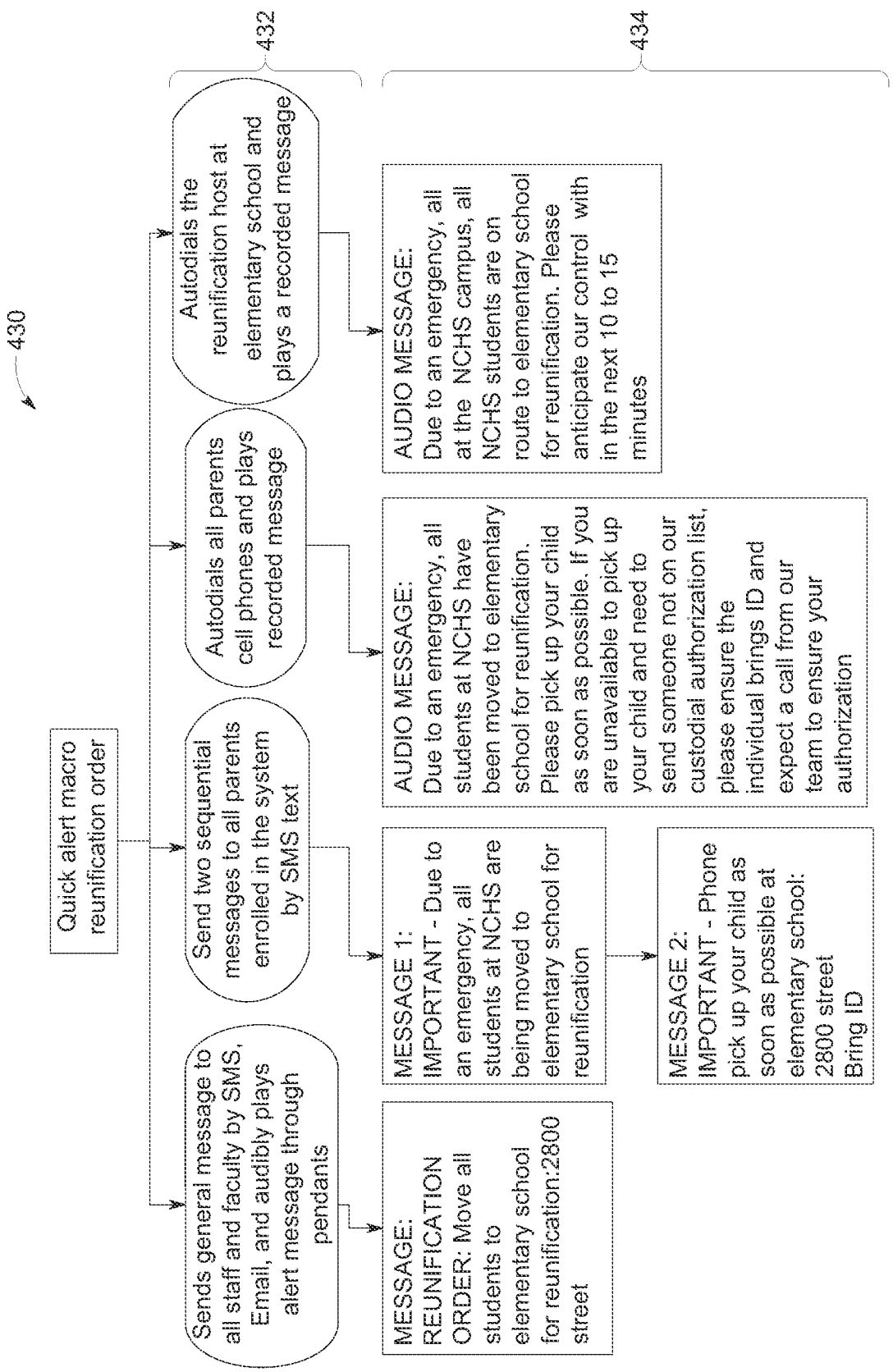
FIG. 11 illustrates a flow chart showing the use of pre-drafted messages of the system.

Referring to FIG. 11, a flow chart showing the use of pre-drafted messages of the system is shown.

The pre-programmed messages for distribution 430 include a process flow to allow for easy use, while ensuring that the correct messages is distributed. For example, when a quick alert reunification order is to be issued, the user chooses between a set of pre-programmed distribution instructions 432. Options include sending a general message to staff and faculty via SMS and email and issuing an audible alert message through the wearable devices. Or, sending multiple messages to parents, starting with SMS, then auto-dialing parents cell phones and playing a prerecorded message. Or auto-dialing the reunification host, the location where all students are to gather after the reunification order is issued, and playing an audio message warning the host of the imminent arrival of a group of students.

Each pre-programmed distribution instructions 432 set includes one or more messages with pre-drafted message content 434. The pre-drafted messages are prepared ahead of time, again expediting the process of issuance.

Referring to FIG. 12, a chart showing response times in various school shooting scenarios is shown.

The goal of this chart is to show the criticality of response time. The time between the beginning of an attack the time at which most casualties are sustained is brief—one to two minutes. Reducing the effective response time, even by a minute or two, has a dramatic effect on the number of casualties sustained.

Figure 13:
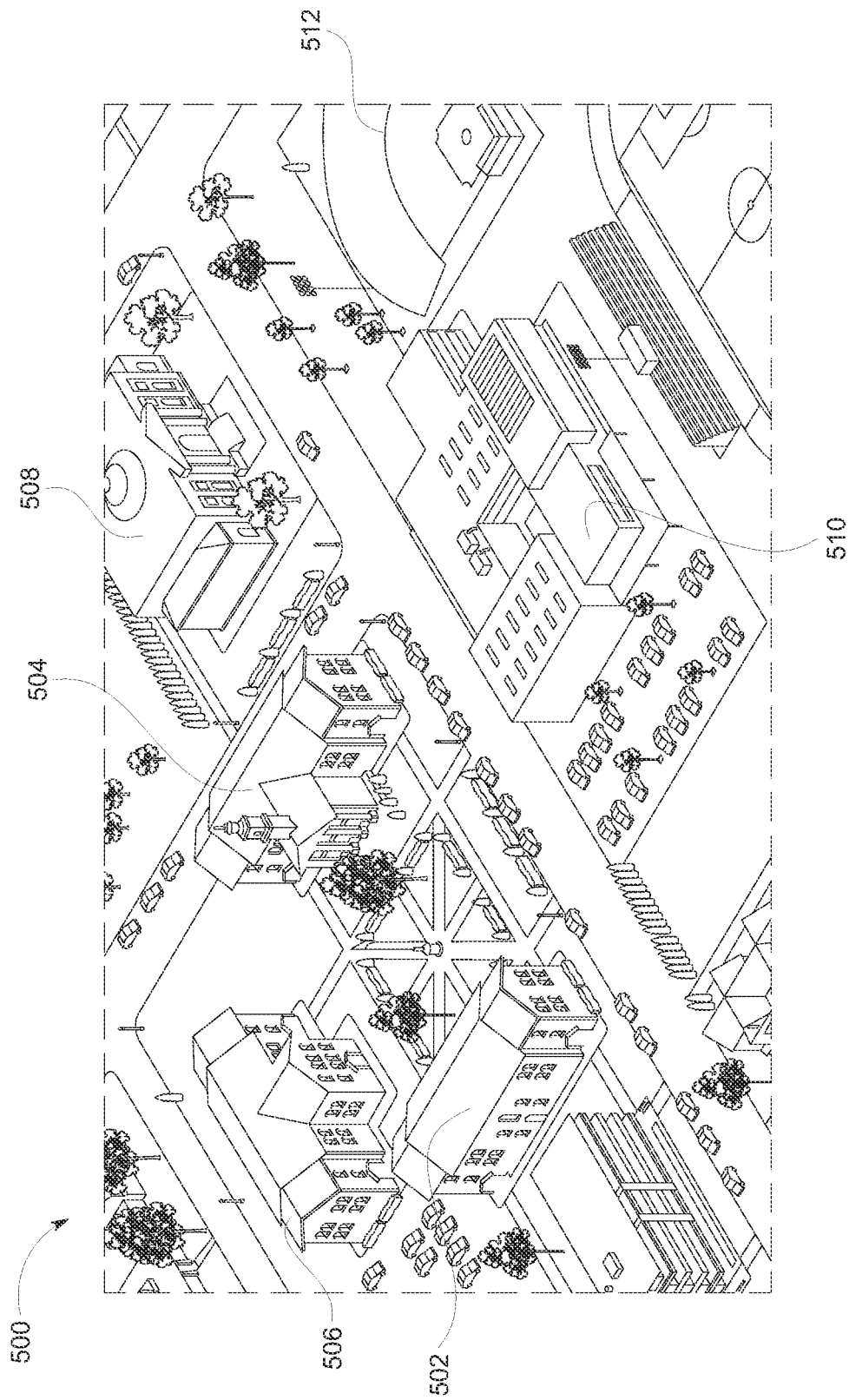
FIG. 13 illustrates a hypothetical campus onto which the system could be deployed.

Referring to FIG. 13, a hypothetical campus onto which the system could be deployed is shown.

On a campus 500, there may be multiple buildings or locations present, shown in this figure as building one 502, building two 504, building three 506, building four 508, building five 510, and stadium or field 512.

On this hypothetical campus 500, it becomes obvious the importance of understanding the location of the faculty member reporting the emergency. Reporting to emergency responders only the name of the campus on which the emergency is taking place is not specific enough.

Upon arrival, emergency personnel would not know which building, or stadium, to enter.

Additionally, if, for example, the emergency was in building three 506, the faculty and students in the other buildings would likely be unaware of the emergency, and thus would not know to initiate lockdown procedures.

Only by sharing the location of the emergency in conjunction with issuing campuswide faculty notifications—preferably using a remotely accessible public address system—can emergency personnel know where to focus and can all members of the campus be notified of the hazard.

Figure 14:
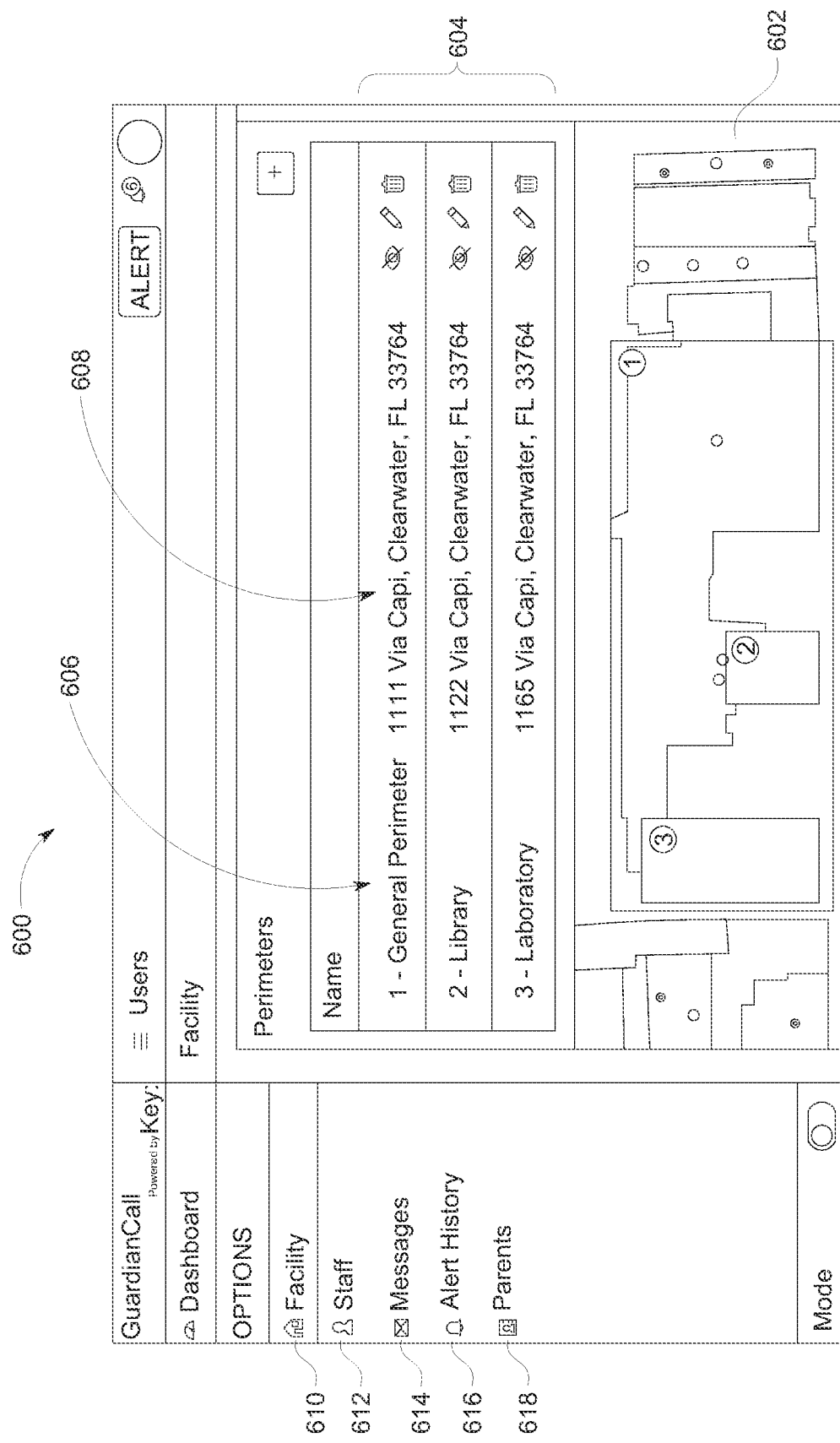
FIG. 14 illustrates the system dashboard or web interface for access by system administrators.

Referring to FIG. 14, the system dashboard or web interface for access by system administrators is shown.

The system web interface 600 is shown. A map 602 includes one or more pre-programmed areas 604, allowing the operator to quickly determine in which area an alert is located.

Each pre-programmed area 604 includes an area title 606 and area address 608.

Additional information is accessible using the menu on the left, including selection of the most relevant facility 610, information on the staff 612, reviewing messages 614, a list of alert history 616, and the means to communicate quickly with parents 618.

It is anticipated that the system web interface 600 is used by users who are responsible for management of an installed emergency notification system. The system web interface 600 may be accessed by on-site users, or off-site users, including a central management service.

Figure 15:
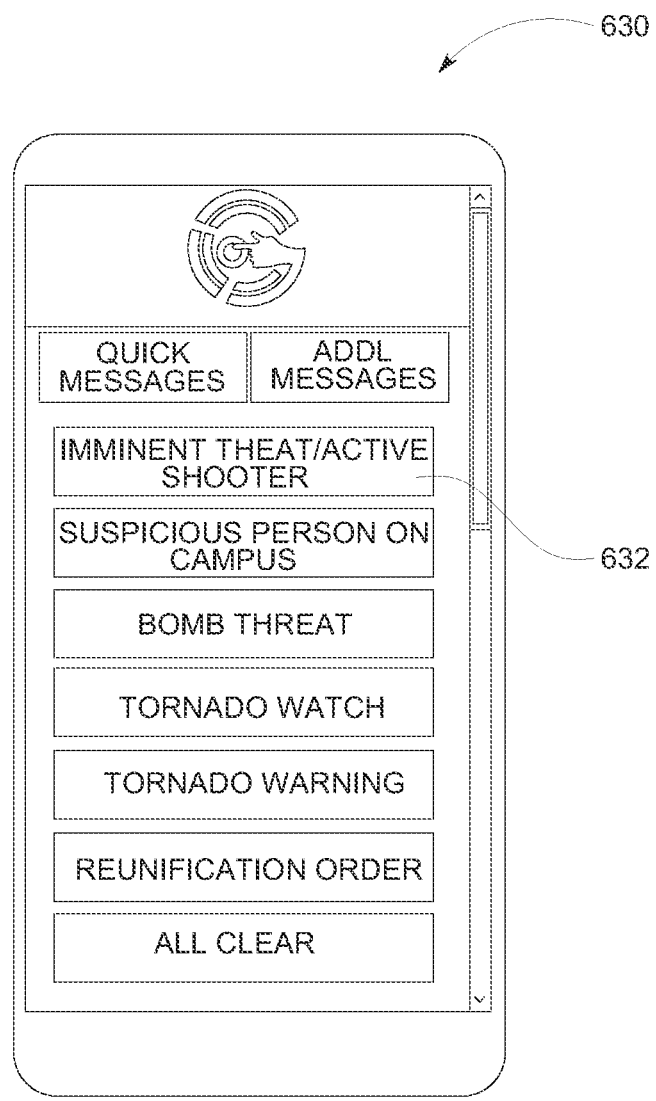
FIG. 15 illustrates a phone interface for sending pre drafted messages through the system.

Referring to FIG. 15, a phone interface for sending pre-drafted messages through the system is shown.

The quick messaging interface 630 is formed from the series of graphical buttons, activated by the users touch via the touchscreen.

The quick messaging interface 630 includes several pre-drafted message topics 632 to allow a user to quickly choose the most relevant communication.

Figure 16:
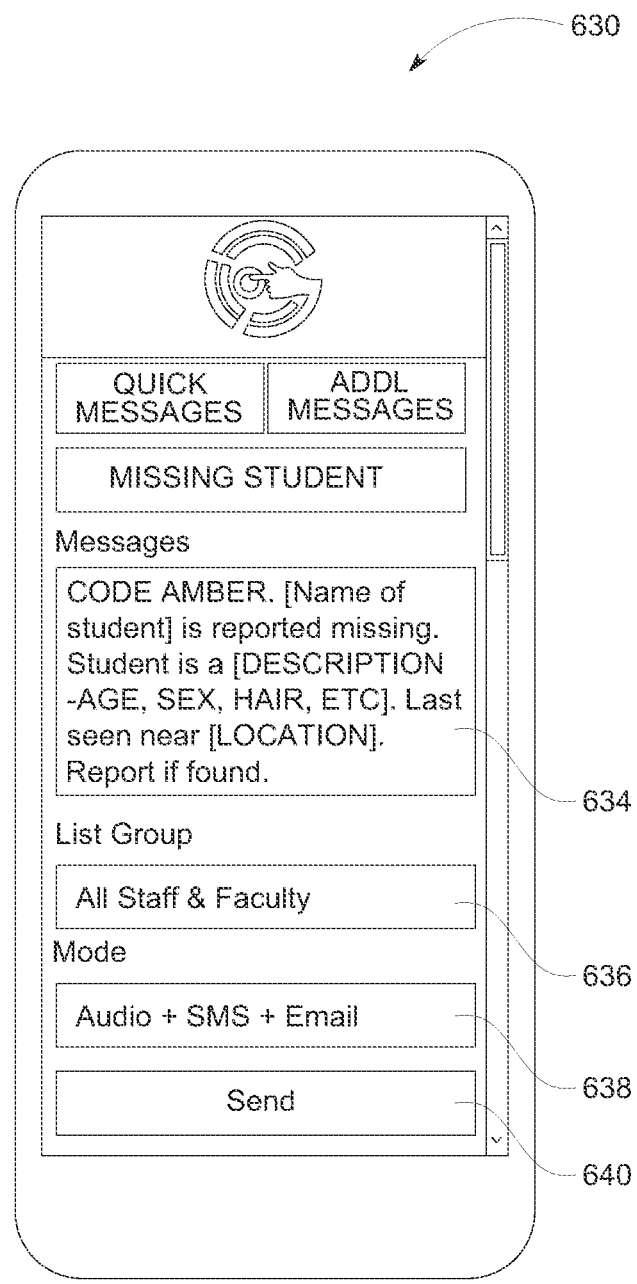
FIG. 16 illustrates an example template message for sending through the system.

Referring to FIG. 16, an example template message for sending through the system is shown.

The quick messaging interface 630 now shows one of the template messages, specifically for a missing student. Included is a message topic 632, template message 634, pre-program distribution group 636, distribution mode 638, and send button 640.

Figure 17:
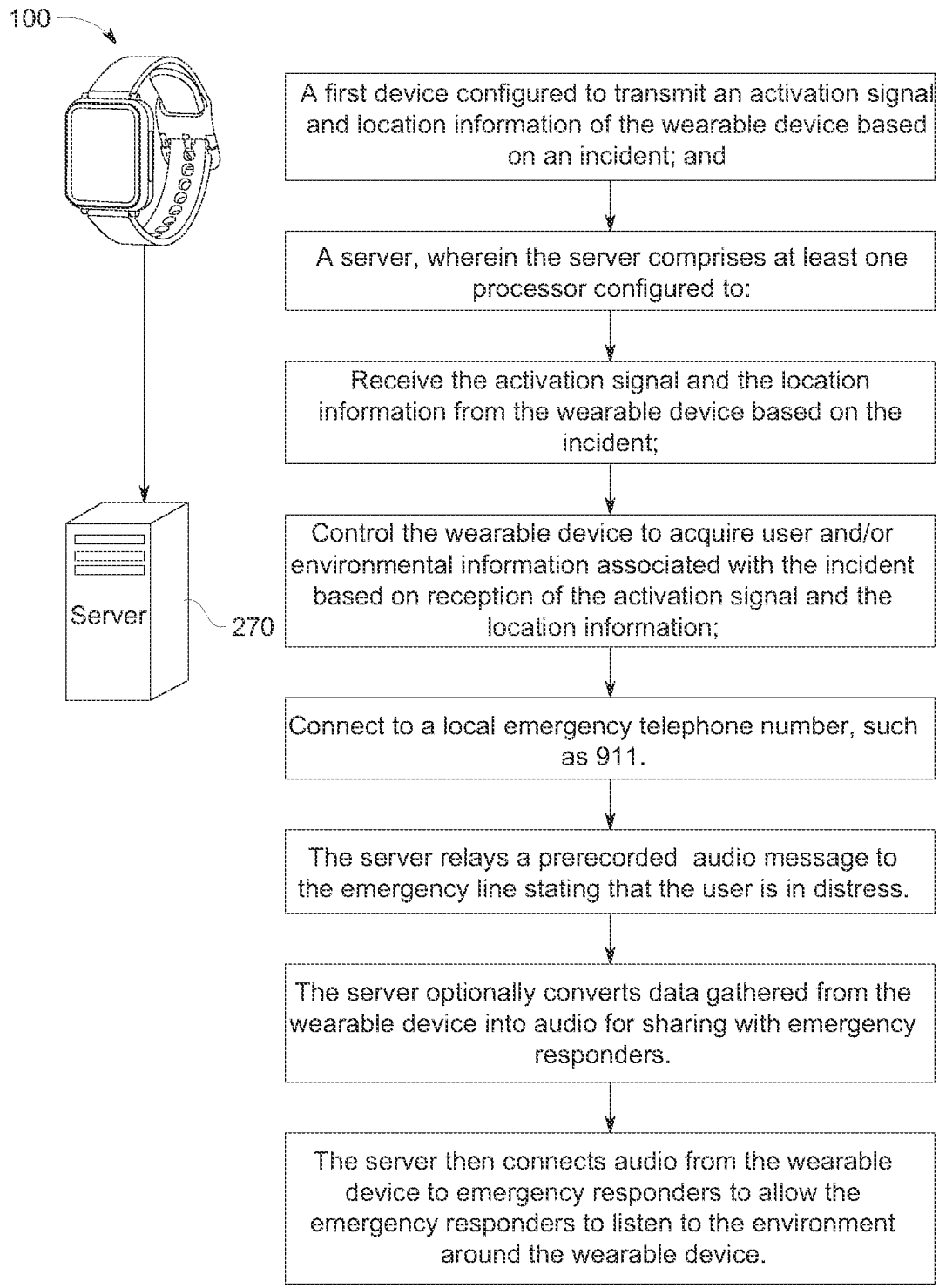
FIG. 17 illustrates a flow chart of a second embodiment of the wearable device for use by an individual.

Referring to FIG. 17, a flow chart of a second embodiment of the wearable device for use by an individual is shown.

The second embodiment of the wearable device 100 is intended for use by an individual in a situation where security may be an issue. For example, a real estate agent giving a tour of a home.

Upon activation, the wearable device 100 is configured to transmit an activation signal and location information based on an incident. This information is received by a server 270, the server is configured to receive the activation signal and location information from the wearable device.

The server then controls the wearable device to acquire additional information, including environmental information or user status.

The server then connects to the local emergency telephone number, such as 911.

Because the user of the wearable device is likely in a compromised scenario, and likely unable to engage in a two-way dialogue with emergency services, the server plays a prerecorded message to emergency services stating that the user is in distress.

The server then optionally converts data gathered from the wearable device into audio for sharing with emergency responders. For example, GPS coordinates, physical address, user status such as heartbeat, and stress response are shared with emergency services using text-to-speech algorithms. Alternatively, if emergency services supports direct transmission of data, the data gathered by the wearable device can be provided via this alternative transmission method.

The server then connects audio from the wearable device to emergency responders to allow the emergency responders to listen to the environment around the wearable device.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A notification system, comprising:
a wearable device configured to transmit an activation signal and location information of the wearable device based on an incident; and
a server, wherein the server comprises at least one processor configured to:
receive the activation signal and the location information from the wearable device based on the incident;
control the wearable device to acquire environmental information associated with the incident based on reception of the activation signal and the location information; and
control each of a plurality of wearable devices to output a notification of the incident simultaneously, wherein an output mode of a first device of the plurality of wearable devices is different from an output mode of a second device of the plurality of wearable devices.

2. The notification system according to claim 1, wherein the plurality of wearable devices includes at least audio devices, display devices, and user devices of a group of people, and wherein the at least one processor is further configured to:
control the audio devices to output at least one of an alarm, an audible alert, or a pre-recorded message;
control the display devices to display alert information on a screen; and
control the user devices of the group of people to output at least one of a voice call notification, a text message, or a video call notification.

3. The notification system according to claim 2, wherein the at least one processor is further configured to:
acquire, from a database, contact information associated with each user device of the user devices of the group of people based on a type of the incident; and
control each of the user devices of the group of people to output the notification of the incident based on the contact information.

4. The notification system according to claim 3, wherein the group of people includes at least one of a faculty member, general emergency responders, and a dedicated emergency team for an area of the incident.

5. The notification system according to claim 2, wherein the at least one processor is further configured to:
transmit an alert signal to each of the plurality of wearable devices; and
control each of the plurality of devices to output the notification of the incident based on transmission of the alert signal.

6. The notification system according to claim 1, wherein the plurality of wearable devices includes both on-site devices and off-site devices, wherein the on-site devices are present in an area of the incident, and wherein the off-site devices are present outside the area of the incident.

7. The notification system according to claim 1, further comprising public address devices, and wherein the at least one processor is further configured to control each of the public address devices simultaneously to output public address notification by display of details of information of the incident or audio output of announcement related to the incident.

8. The notification system according to claim 5, wherein the at least one processor is further configured to concurrently control, based on user input for the activation signal, the wearable device to contact the group of people and the plurality of wearable devices to output the notification of the incident.

9. The notification system according to claim 1, wherein the environmental information of the incident includes at least one of a heart rate, stress-response measurements, and environmental noise of the incident.

10. The notification system according to claim 9, wherein the at least one processor is further configured to trigger a lockdown of one of a partial area of the incident or an entire area of the incident, based on the environmental information of the incident.

11. The notification system according to claim 1, wherein the notification includes at least one of the location information, a user condition of a user of the wearable device, a situation of an area of the incident, and a remedy action to avoid the incident.

12. The notification system according to claim 9, wherein the at least one processor is further configured to:
control the wearable device to display a type of the incident;
receive user confirmation on the type of incident displayed; and
control the plurality of wearable devices to output the notification based on the reception of the user confirmation.

13. The notification system according to claim 3, wherein the at least one processor is further configured to:
control the wearable device to display multiple options of the incident type after on reception of the activation signal; and
display the type of the incident on the plurality of wearable devices based on user selection of the type of the incident.

14. The notification system according to claim 1, wherein the wearable device is further configured to:
determine a type of the incident based on an analysis of the environmental information.

15. The notification system according to claim 14, wherein the wearable device is further configured to automatically dial a contact of emergency responders based on an absence of user input to disable a call.

16. A method for notification, comprising:
transmitting an activation signal and location information of a first wearable device based on an incident;
receiving the activation signal and the location information from the first wearable device based on the incident;
controlling the first wearable device to acquire environmental information associated with the incident based on reception of the activation signal and the location information;
controlling a plurality of devices to simultaneously output a notification of the incident, wherein an output mode of the first wearable device is different from an output mode of the plurality of devices.

17. The method according to claim 16, wherein the plurality of devices includes at least audio devices, display devices, and user devices of a group of people, further comprising:
controlling the audio devices to output at least one of an alarm, an audible alert, or a pre-recorded message;
controlling the display devices to display alert information on a screen; and
controlling the user devices of the group of people to output at least one of a voice call notification, a text message, or a video call notification.

18. The method according to claim 17, further comprising:
acquiring, from a database, contact information associated with each user device of the user devices of the group of people based on a type of the incident; and
controlling each of the user devices of the group of people to output the notification of the incident based on the contact information.

19. The method according to claim 16, further comprising:
transmitting an alert signal to each of the plurality of devices; and
controlling each of the plurality of devices to output the notification of the incident based on transmission of the alert signal.

20. The method according to claim 16, wherein the plurality of devices includes public address devices, further comprising controlling each of the public address devices simultaneously to output public address notification by display of details of information of the incident or audio output of announcement related to the incident.

* * * * *